> United States Patent Office 3,133,905
Patented May 19, 1964

3,133,905
POLYHYDROXYL TERMINATED POLYETHERS
Carl E. Snyder and John A. Lovell, Cuyahoga Falls, Ohio, assignors to The Goodyear Tire & Rubber Company, Akron, Ohio, a corporation of Ohio
No Drawing. Filed May 23, 1960, Ser. No. 30,742
20 Claims. (Cl. 260—88.3)

This invention relates to a process for preparing high molecular weight polymeric polyether glycols or polyols containing unsaturation and to the products of said process. More specifically, this invention relates to the preparation of unsaturated polymeric polyether glycols and polyols by the polymerization of at least an unsaturated epoxy aliphatic monomer with a heterocyclic compound.

With the advent of the unsaturated sulfur curable polyurethane elastomers, the need for unsaturated glycols and related polyols as intermediates in the production of these elastomers was soon apparent. However, despite this urgent need for the unsaturated glycols, the only ones used and/or available for this purpose, as far as applicants know, are low molecular weight unsaturated glycols, i.e., those of about 150 molecular weight.

A principal object of this invention is to provide unsaturated polymeric polyether glycols and related polyols having a molecular weight of about 250 to 16,000 and having at least one unsaturated bond per 8000 units of molecular weight. A further object of this invention is to provide intermediates for the preparation of unsaturated polyurethanes, which may be sulfur cured. Another object of this invention is to prepare and to provide polyether glycols or related polyols which may be sulfur cured to give novel semi-solid to solid materials that are extendable with polyisocyanates to obtain polyurethane rubbers which have their primary orientation or organization determined prior to the formation of the urethane linkage. Still another object of this invention is to provide polyether glycols useful in making polyurethane rubbers having improved low temperature properties.

In general, this invention comprises the copolymerization of at least one unsaturated epoxy aliphatic monomer of less than 240 molecular weight with a heterocyclic compound having an oxygen-carbon ring containing a total of 3, 4, 5 or 7 atoms, the polymerization occuring in the presence of a catalyst capable of rupturing the carbon-oxygen bond of a cyclic oxide compound, and then decomposing the polymer catalyst complex with water to hydroxyl-terminate the resulting polymer. In practice the unsaturated epoxy aliphatic monomer and the heterocyclic compound may be placed in the reaction vessel before or after the catalyst, but the important thing in making these additions is that the rate of addition of either the catalyst or the reactants be controlled to prevent the reaction from becoming violent. Normally, maintaining the temperature of the reaction system below about 0° C. will keep the reaction within safe bounds. However, it is preferred to place the heterocyclic compound together with the catalyst in the reaction vessel, and then slowly add and stir the unsaturated epoxy aliphatic monomer immediately into the heterocyclic compound-catalyst mixture. Usually about 1 to 40% by weight of unsaturated epoxy aliphatic monomer is stirred into the heterocyclic compound mixture with the preferred amount being from about 5 to 15%. After the last of the monomer is added, stirring is continued until the desired degree of polymerization is achieved. Then the reaction mixture is warmed to room temperature and several volumes of water are added to decompose the polymer-catalyst complex to thereby hydroxyl-terminate the polymer. The water layer formed upon the addition of water is separated from the polymer layer. After further water washing, the polymer layer may be subjected to vacuum distillation to free the unsaturated polymeric ether glycol of low boiling impurities.

In one embodiment of this invention, a nucleus generating compound containing a plurality of reactive hydrogens is reacted in the presence of a suitable catalyst with sufficient monomer to replace the reactive hydrogens thereof with a relatively short polyoxyalkylene-catalyst complex adduct; the length of the relatively short polyoxyalkylene-catalyst complex adduct is then extended by polymerizing another monomer on said polyoxyalkylene-catalyst complex group to give a longer cogeneric polyoxyalkylene chain complexed with the catalyst; and then the cogeneric polyoxyalkylene catalyst complex is decomposed with water to form the terminal hydroxyl groups. On the other hand, bases such as sodium hydroxide or acids such as acetic acid may be used in place of water to accomplish the same object. The resulting hydroxyl-terminated polyether may be recovered from its mixture by distillation to remove the lower boiling materials.

In general, the nucleus or residue of the nucleus generating compound occurs in the polyether polyol only once per polymer molecule. This results from the fact that the polyoxyalkylene group formed by the copolymerization of the heterocyclic compound and the epoxyaliphatic monomer is attached to the nucleus remaining after the removal of the reactive hydrogens.

The best way to obtain this result is to place the nucleus generating compound and the catalyst in the reaction vessel, and then slowly add the heterocyclic compound and/or the unsaturated epoxy aliphatic monomer to the stirring mixture. Thus, the active hydrogens of the nucleus generating compound are replaced by polyoxyalkylene groups formed by the polymerization of said monomer. This may be illustrated in the following manner: when ethylene oxide reacts with ethylene glycol, it replaces the reactive hydrogens of the glycol to thereby form a polyether containing the —O—C—C—O— group as its nucleus with polyoxyethylene groups attached thereto. Similarly, if adipic acid is used instead of ethylene glycol, the nucleus would have the following sketal formula:

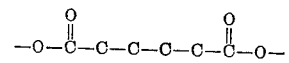

The structure of the nucleus is determined by the nature of the nucleus generating compound. The ether glycols will generate a nucleus of the formula:

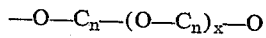

where $n$ may be an integer greater than 1 and less than about 20 and $x$ may be an integer from 0 to about 20.

It should be obvious to one skilled in the art that a triol or tetraol will form a nucleus different from the diols. For example, where the tetraol is pentaerythritol the nucleus will be as follows: $C(CH_2O)_4—$. Specific examples of some typical nucleus generating compounds of the polyol type are ethylene glycol, propylene glycol, hexane-triol, polyethylene glycol, trimethylol ethane, trimethylol propane, pentaerythritol, etc. Examples of typical polycarboxylic materials useful as nucleus generating compounds are oxalic acid, adipic acid, azelaic acid, suberic acid, phthalic acid, and the anhydrides and acyl halides thereof.

Where the epoxy aliphatic monomer, for instance, butadiene monoxide, is present and copolymerizes with a heterocyclic compound, such as tetrahydrofuran, it will introduce a polymethyleneoxy group containing a pendant ethylenic ($H_2C=CH—$) group into the polymer molecule to give a cogeneric poly (oxyalkylene) group. This cogeneric poly (oxyalkylene) group contains both the oxytetramethylene group and the oxybutadiene group while the end methylene group of said poly(oxyalkylene) group will contain a hydroxyl group on its terminal carbon atom after decomposition of the poly(oxyalkylene) catalyst complex with water. Normally, either the epoxy aliphatic monomer or the heterocyclic compound may be attached to the nucleus depending on which monomer is added first.

The heterocyclic compounds useful in this invention have at least two carbon atoms interconnected with at least one oxygen atom to form a ring. This ring may contain a total of 3, 4, 5, 7 or 8 atoms. These compounds are exemplified by ethylene oxide; 1,2-propylene oxide; 1,3-propylene oxide; tetrahydrofuran; dioxepine (sometimes referred to as cyclobutenediol formal) and 3,3'-di(chloromethyl) trimethylene oxide (sometimes called pentonic oxide).

The heterocyclic compounds are limited to those that are saturated since some unsaturated heterocyclic compounds such as furan are not polymerized with these catalysts.

Since the unsaturation is introduced into the polyether glycols of this invention by the epoxy aliphatic monomer rather than by the heterocyclic compound, the polyether glycols will have pendant unsaturation instead of unsaturation within the chain or backbone per se of said glycol. This is good because the polyether glycols having pendant unsaturation are known to respond more readily and definitely to sulfur curing than those having linear unsaturation.

The epoxy aliphatic monomers useful in this invention contain at least one double bond and have a molecular weight less than about 240. They are of the alkadiene monoxide type or of the epoxyalkyl alkylene ether type. In general, the epoxy aliphatic monomer may contain up to about 18 carbon atoms, or combined carbon and oxygen atoms. The preferred monomers, however, are those containing less than about ten atoms. Also, these lower molecular weight monomers are thought to be more reactive and to produce polymeric diols extendable by polyisocyanates to rubbers having better low temperature properties. One type of epoxy aliphatic monomer is the alkadiene monoxides; they are exemplified by butadiene monoxide, isoprene monoxide, epoxyoctene, and epoxyoctadecene. The preferred members of this class have from 4 to 10 carbon atoms. Another type of epoxy aliphatic monomer is the epoxyalkyl alkylene ethers. Allyl glycidyl ether, vinyl glycidyl ether and epoxy octyl octylene ether are some typical examples of these epoxyalkyl alkylene ethers. The catalyst of this invention may be any of the well known materials capable of breaking the carbon to oxygen bond within the heterocyclic compound ring to initiate polymerization. These compounds may be either basic or acidic in nature with the acidic catalyst being preferred. Examples of the basic catalyst are sodium oxide, sodium hydroxide, the other alkali oxides and hydroxides, and the other basic materials capable of breaking the epoxy ring of ethylene or propylene oxide. Generally up to 5% by weight of these basic catalysts may be used with the preferred range being 0.25 to 1%. It should be appreciated that the basic catalysts, for example, sodium hydroxide or the sodium alcoholates, are incapable of splitting the oxygen-carbon bond of these heterocyclic compounds, such as tetrahydrofuran, having a ring containing more than a total of three atoms of carbon and oxygen. Therefore, the preferred catalysts are the acidic catalysts which are able to break the carbon-oxygen bond within the ring of a heterocyclic compound having a ring of 5 total atoms, i.e. tetrahydrofuran, as well as one of 3 total atoms, for example ethylene oxide or propylene oxide.

These acidic catalysts are sometimes referred to as Lewis acids and are illustrated by such material as fluorosulfonic acid, boron trifluoride, boron trifluoride etherate and antimony trichloride. The named materials are the preferred members of the acidic catalysts. This preference is based on the fact that these members can rupture the carbon-oxygen bond of a heterocyclic ring containing a total of 5 or 7 atoms as readily and effectively as they can split a 3 or 4 atom ring. A further advantage of these particular catalysts is that they do not destroy the double bond of the reactants, although certain antioxidant materials such as quinone, butyl catechol, etc. may be used advantageously to further guard against destruction of the double bond. Generally 10% of these acidic catalysts may be used, but the preferred range is 0.5 to 5%.

By varying the ratio of the unsaturated epoxy aliphatic monomer to heterocyclic compound, the nature of the polyether glycols may be varied to give a wide range of unsaturation within the polymer. In fact the unsaturation as measured by the iodine number, for instance, may vary from a very high to a relatively low value. This permits the unsaturation within the polyether glycol to be varied from about one double bond per 8000 units of molecular weight to as high as about one double bond per 100 units of molecular weight. The preferred range of values for obtaining the best balance of rubber physical properties is about one double bond for each 1000 to 3000 units of molecular weight. This great flexibility in the degree of unsaturation is indeed fortuitous, since experience discloses that at least about one double bond for about each 8000 units of molecular weight is required to give the rubber noticeable sulfur curing properties. Rubber compounding practice indicates that at least one double bond per 5000–6000 units of molecular weight of the uncured rubber is preferred.

Although the primary use for the unsaturated polyether glycols of this invention probably will be found as intermediates in the preparation of polyurethane rubbers, an alternate use for these materials is to esterify them with a polycarboxylic acid to form polyesters, which may be used for example in forming sheets, coating, etc.

Since the novel polyether glycols of this invention contain pendant unsaturation, these polyether glycols may be given a precure with sulfur to achieve a certain degree of crosslinking and thereby orientate or organize its molecular structure to a certain extent prior to the time the polyether glycol is converted to a polyester or a polyurethane. Hence, the unsaturation of those very highly unsaturated polyethers, such as the one illustrated in Example 4, may be used to increase the molecular weight of the polymer by a precure with sulfur or peroxide. This treatment will convert an oil to a semi-solid or solid material which may still be extended with polyisocyanate to give a rubber that is partially or wholly sulfur or peroxide cured prior to its formation.

Further objects and advantages of this invention will be apparent from the following examples wherein the ingredients are given in parts by weight.

*Example 1*

Tetrahydrofuran (1500 parts) and allyl glycidyl ether (250 parts) were mixed together within a clean, dry resin pot equipped with a stirrer, reflux condenser and a dropping funnel. This mixture was cooled to $-10°$ C. and a solution consisting of 75 parts boron trifluoride and 750 parts of tetrahydrofuran was added slowly over a period of about 30 minutes while maintaining the temperature at $-10°$ C. The mixture was stirred during and after the addition of the catalyst until the temperature was about 5° C. At this point about 65% of the monomers had been converted into a polyether-catalyst complex. This complex was broken by stirring 750 parts of water into the mixture to hydroxylate the polymer. The contents of the pot was washed at about 95° C. until free of halide. Water and unreacted monomer was removed overhead from the hydroxylated polymer by distillation at 100° C. under 1 to 2 millimeters of pressure. The product drawn from the resin pot was a pale yellow viscous oil having a molecular weight of 2270 and a hydroxyl number of 49.4. The molecular weight determined from the hydroxyl number checked very closely with the molecular weight determined by the ebullioscopic method.

This polyether glycol extended readily with tolylene diisocyanate to give a polyurethane elastomer. This polyurethane material was stabilized and then compounded on the mill with conventional sulfur-curing agents and then this compounded polyurethane was shaped and cured at elevated temperature to give a cured rubber article having good physical properties.

*Example 2*

A copolymer of tetrahydrofuran and butadiene monoxide was prepared according to the procedure of Example 1 using the following ingredients: 1500 parts of tetrahydrofuran, 250 parts of butadiene monoxide, a solution consisting of 75 parts of boron trifluoride and 750 parts of tetrahydrofuran. Tertiary butyl catechol (2.5 parts) was added to the reaction pot to prevent the double bond of the monomer or polymer from being destroyed during the course of the polymerization. The resulting copolymer comprised roughly 90% tetrahydrofuran and 10% butadiene monoxide. This copolymer had a molecular weight of 2084, a hydroxyl number of 54, and the ability to consume a considerable amount of Wijs solution, which indicated the presence of considerable unsaturation.

*Example 3*

A polyether glycol was prepared by copolymerizing butadiene monoxide with a copolymer of ethylene glycol and propylene oxide to give a polymer comprising roughly 90% propylene oxide and 10% butadiene monoxide. This copolymer was prepared by charging ethylene glycol (⅜ mol), propylene oxide (7½ mols), and butadiene monoxide (0.75 mol) to a pressurized resin pot containing 3.8 parts of solid sodium hydroxide. The pot contained 2.4 parts of phenyl beta naphthylamine to prevent the polymerization of the double bond of the butadiene monoxide. After 2 hours and 15 minutes, the temperature of the mixture in the pot had risen from 24° C. to 270° C. while the pressure had risen from 20 to 210 pounds per square inch gauge. The reaction mixture was stirred 2 hours longer for a total of 4 hours and 15 minutes. At this time the temperature and pressure within the pot was 64° C. and 25 pounds per square inch gauge. With cooling water circulating in the cooling system, the contents of the pot soon returned to room temperature. The pot was vented and opened. The reaction mixture was washed until free of catalyst and then freed of water by distillation. The resulting polyether glycol had a reddish-green color and a molecular weight of 2960, a hydroxyl number of 37.9 and an iodine number of 15.9. This particular iodine number represents one double bond for each 1600 units of molecular weight of the polyether glycol.

*Example 4*

1,3-dioxepine (150 parts) was charged to the resin pot of Example 1. Then 4.4 parts of freshly distilled ethylene oxide was charged to the pot. The stirrer was started and the mixture was chilled to −65° C. With the agitator operating, 100 cc. of an ether solution of boron trifluoride etherate (15 parts of boron trifluoride) was added to the resin pot over a period of about 90 minutes. About an hour after the last addition of boron trifluoride, the temperature of the pot had risen to about 25° C. At this time, the stirrer was stopped, and the reaction mixture was allowed to stand at room temperature for about 16 hours. The reaction mixture was washed with water, followed by a weak sodium hydroxide wash, and then with a further water wash. The washed and neutral polymer was vacuum stripped in an atmosphere of dry nitrogen to obtain a dark brown viscous oil having a hydroxyl number of 41.1, a molecular weight of 2720 and an iodine number of 199. This iodine number represents one double bond for each 127 units of polymer molecular weight.

This oil may be sulfur-cured with a conventional GR–S sulfur recipe to give a semi-solid to solid substance which can be extended with diisocyanate to give a semi-rubbery substance.

From the above examples, it is readily apparent that this invention provides a very effective method for preparing polymeric ether glycols having varying degrees of unsaturation. Also, this invention provides a method for making polymeric ether glycols which have varying degrees of unsaturation and contribute improved low temperature properties to its rubber derivatives. Thus, applicants novel polymers provide new compounds which may be either sulfur or peroxide cured to give the elastomer a certain degree of orientation prior to the formation of the urethane linkage.

While certain representative embodiments and details have been shown for the purpose of illustrating the invention, it will be apparent to those skilled in this art that various changes and modifications may be made therein without departing from the spirit or scope of the invention.

What is claimed is:

1. Polyether glycols of at least about 250 and no more than 16,000 molecular weight having at least one unsaturated bond for each 8,000 units of molecular weight comprising the copolymeric reaction product of (1) a saturated heterocyclic compound having a ring consisting of at least 2 carbon atoms and one oxygen atom, said ring being selected from the class consisting of those containing 3, 4, 5, and 7 total atoms per ring with (2) an epoxy aliphatic monomer containing at least one ethylenic double bond and having a molecular weight less than about 240, which is hydroxyl terminated to give substantially at least 2 hydroxyls per molecule, the copolymeric reaction occurring in the presence of .5 to about 10% by weight of the copolymerization reactants of a Lewis acid catalyst capable of decomposing the carbon-oxygen bond in the ring of a monomer containing at least two carbon atoms and one oxygen in said ring to initiate polymerization thereof.

2. The polyether glycol copolymer of claim 1 wherein the epoxy aliphatic monomer is an alkadiene monoxide.

3. The copolymer of claim 2 wherein the epoxy aliphatic monomer is butadiene monoxide.

4. The copolymer of claim 2 wherein the epoxy aliphatic monomer is isoprene monoxide.

5. The copolymer of claim 1 wherein the epoxy aliphatic monomer comprises by weight at least 5% and no more than about 15% of said copolymer.

6. A polyhydroxyl terminated polyether having a molecular weight of at least 250 and no more than about 16,000 with at least one double bond for each 8000 units of molecular weight comprising the copolymerization product of (1) a saturated heterocyclic compound having a ring consisting of at least two carbon atoms and one oxygen atom, said ring being selected from the class consisting of those containing 3, 4, 5, and 7 total atoms per ring and (2) an epoxy aliphatic monomer having a molecular weight of less than 240 and containing at least one ethylenic double bond per molecule with (3) a nucleus generating compound containing a plurality of reactive hydrogen atoms to replace each of the reactive hydrogens with a cogeneric polyoxy alkylene group containing a hydroxyl group to give substantially at least 2 hydroxyls per molecule, said copolymeric product being formed in the presence of a catalyst capable of decomposing the carbon-oxygen-bond in the ring of a monomer containing at least two carbon atoms and one oxygen atom in the ring to initiate polymerization, said catalyst being selected from the class consisting of basic and Lewis acids with the amount of the catalyst based on the copolymerization reactants being from .5 to about 10% by weight for the acid catalyst and .25 to about 5% by weight for the basic catalyst.

7. The polyether glycol of claim 6 wherein the nucleus generating compound is a glycol.

8. The polyether glycol of claim 7 wherein the glycol is ethylene glycol.

9. The polyether glycol of claim 6 wherein the aliphatic monomer is butadiene monoxide and the nucleus generating compound is a polydiol.

10. The polyether of claim 6 wherein the epoxy aliphatic monomer comprises by weight at least 5% and no more than about 15% of said polyether.

11. The polyether of claim 9 wherein the butadiene monoxide comprises by weight at least 5% and no more than about 15% of said glycol.

12. A process for producing polyhydroxyl terminated polyethers having a molecular weight of at least 250 and no more than about 16,000 with at least one double bond for each 8000 units of molecular weight comprising copolymerizing in the presence of .5 to about 10% by weight of the copolymerization reactants of a Lewis acid catalyst capable of decomposing the carbon-oxygen bond in the ring of a monomer containing at least two carbon atoms and one oxygen in said ring to initiate polymerization thereof, (1) a saturated heterocyclic compound having a ring consisting of at least two carbon atoms and one oxygen atom, said ring being selected from the class consisting of those containing 3, 4, 5, and 7 total atoms per ring with (2) an epoxy aliphatic monomer having a molecular weight less than 240 and then treating the copolymerization product with sufficient water to decompose the catalyst complex.

13. The process of claim 12 wherein the catalyst is of the Lewis acid type.

14. The process of claim 13 wherein the catalyst is boron trifluoride.

15. The process of claim 12 wherein the catalyst concentration is at least 0.08 percent and no more than about 5.3 percent of heterocyclic compound.

16. A process for producing polyhydroxyl terminated polyethers having a molecular weight of at least 250 and no more than about 16,000 with at least one double bond for each 8000 units of molecular weight comprising reacting in the presence of a catalyst capable of decomposing the carbon-oxygen-bond in the ring of a monomer containing at least two carbon atoms and one oxygen atom in the ring to initiate polymerization, said catalyst being selected from the class consisting of basic and Lewis acids with the amount of the catalyst based on the copolymerization reactants being from .5 to about 10% by weight for the acid catalyst and .25 to about 5% by weight for the basic catalyst, (1) a nucleus generating compound containing a plurality of reactive hydrogens with a monomer to replace each of said reactive hydrogens with a polyoxyalkylene catalyst complex with said complex being attached to the residue of the nucleus generating compound left when the reactive hydrogens have been replaced, (2) extending the length of said polyoxyalkylene catalyst complex by a cogeneric polymerization of said polyoxyalkylene catalyst complex with a second monomer to increase the molecular weight thereof, and (3) decomposing the cogeneric polyoxyalkylene catalyst complex to hydroxyl terminate the cogeneric product, said monomers being an epoxy aliphatic monomer having a molecular weight less than 240 and containing at least one ethylenic double bond and a saturated heterocyclic compound having a ring consisting of at least two carbon atoms and one oxygen atom, said ring being selected from the class consisting of those containing 3, 4, 5, and 7 total atoms per ring, the designation first and second monomers being made without regard to which of said monomers are attached to the residue of said nucleus generating compound.

17. The process of claim 1 wherein the catalyst is a Lewis acid.

18. The process of claim 16 wherein the catalyst concentration is at least 0.08 percent and no more than about 5.3 percent.

19. The process of claim 16 wherein the nucleus generating compound has two reactive hydrogens.

20. The process of claim 18 wherein the catalyst is a boron trifluoride.

References Cited in the file of this patent
UNITED STATES PATENTS

| | | |
|---|---|---|
| 2,674,619 | Lundsted | Apr. 6, 1954 |
| 2,808,391 | Pattison | Oct. 1, 1957 |

FOREIGN PATENTS

| | | |
|---|---|---|
| 1,202,252 | France | July 20, 1959 |
| 914,438 | Germany | July 1, 1954 |